June 2, 1953  S. B. McLEOD  2,640,323

POWER UNIT OF THE FLUID PRESSURE TYPE

Filed Dec. 15, 1950  2 Sheets—Sheet 1

INVENTOR.
STEWART B. McLEOD
BY Whittemore,
Hulbert & Belknap
ATTORNEYS

June 2, 1953  S. B. McLEOD  2,640,323
POWER UNIT OF THE FLUID PRESSURE TYPE
Filed Dec. 15, 1950  2 Sheets-Sheet 2
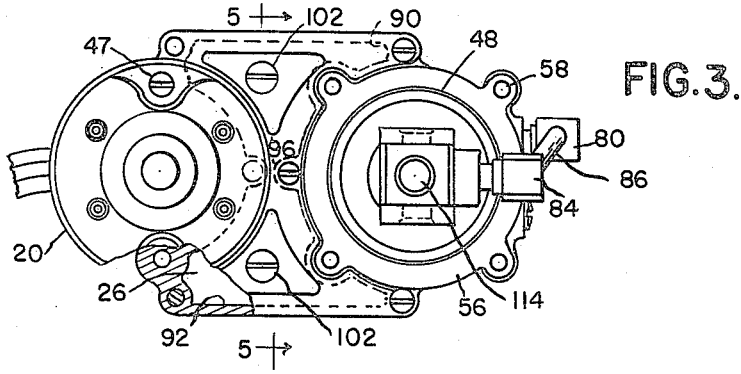
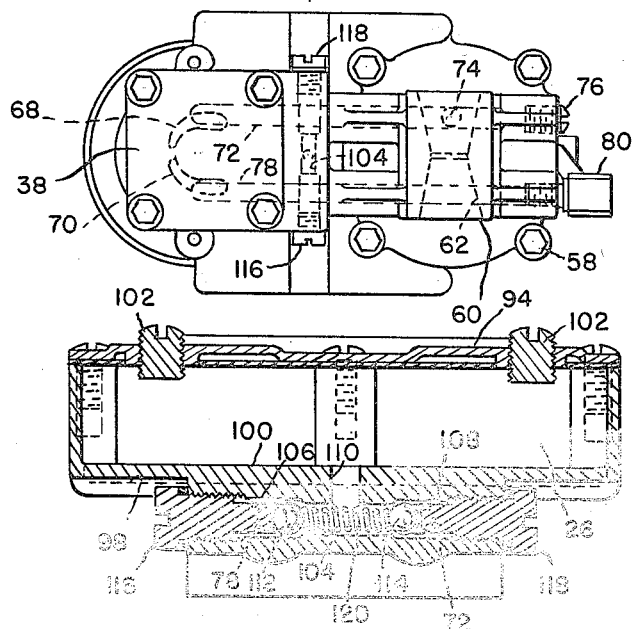
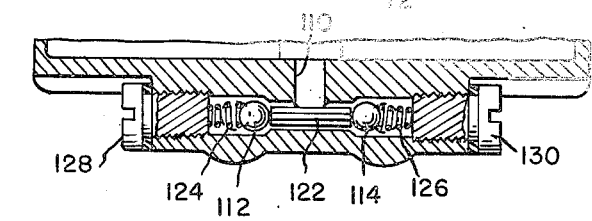
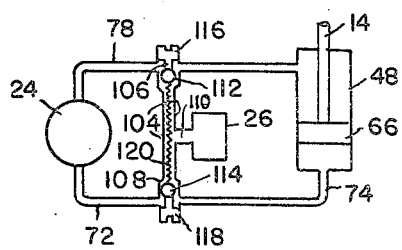
INVENTOR.
STEWART B. McLEOD
BY Whittemore
Hulbert & Belknap
ATTORNEYS Patented June 2, 1953

2,640,323

UNITED STATES PATENT OFFICE 2,640,323

POWER UNIT OF THE FLUID PRESSURE TYPE

Stewart B. McLeod, Dearborn, Mich., assignor to Detroit Harvester Company, Detroit, Mich., a corporation of Michigan Application December 15, 1950, Serial No. 200,953

9 Claims. (Cl. 60—52)

The present invention relates to a compact power unit, and more particularly to a power unit including a hydraulic power device such as a piston and cylinder, a hydraulic pump, a motor for driving the pump, a reservoir for compensating for differential displacement at opposite sides of the piston, valve means controlling the flow of fluid, all of the structure being incorporated in or mounted directly on a unitary supporting base. The present construction is especially designed to occupy limited spaces available in motor vehicles and is thus adapted to serve as the power means for raising and lowering convertible tops, raising and lowering windows, sliding the front seat of the vehicle forwardly and rearwardly, raising and lowering the hood, raising and lowering the rear deck, or for performing other mechanical operations involving the movement of parts.

Inasmuch as the device includes a hydraulic power device such as a piston and cylinder, it preserves the smooth functioning and other advantageous characteristics of hydraulic systems. On the other hand, since it includes a self-contained pump and electric motor, it completely avoids the use of pipes, conduits, or tubes which have previously been employed in carrying hydraulic fluid to a plurality of hydraulic devices from a central pump or the like.

It is an object of the present invention to provide a compact power unit characterized in its efficiency, the small space which it occupies, the economy with which it may be produced, and its advantageous overall operating characteristics.

More specifically, it is an object of the present invention to provide a compact power unit characterized by the use of a unitary base which includes a support for the open end of a hydraulic cylinder which is adapted to serve as the head or end closure for the cylinder.

It is a further object of the present invention to provide in a power unit of the character described, a unitary base including a seat for receiving and closing the open end of a power cylinder, a seat for receiving and positioning one end of an electric motor, a recess for receiving a rotary pump, a reservoir cavity within the base, and fluid passages within the base interconnecting the pump, reservoir and cylinder.

It is a further object of the present invention to provide in structure of the character described in the preceding paragraph, valve chambers within the unitary base for the reception of check valves controlling the flow of hydraulic fluid to and from the reservoir.

It is a further object of the present invention to provide a unitary base for use in a compact power unit in which the base is elongated and has at one end thereof a circular seat for the reception of the otherwise closed end of a hydraulic cylinder and a pivot support at the same end and at the opposite side of said seat, the axis of the pivot support extending perpendicular to and intersecting the axis of the cylinder seat.

It is a further object of the present invention to provide a unitary base of the character described in the preceding paragraph in which a circular recess is provided at the opposite end of the base and a circular seat for the reception of an electric motor is provided at the same end of the base as the motor and at the opposite side thereof.

It is a further object of the present invention to provide a unitary base of the character described in the preceding paragraph in which the base is provided with an enlarged cavity constituting a fluid reservoir and the base is further provided with fluid passages therein connecting the pump, reservoir and the interior of a cylinder mounted on the cylinder seat.

Other objects and features of the invention will become apparent as the description proceeds, especially when taken in conjunction with the accompanying drawings, wherein:

Figure 3 is a top plan view of the unit shown in Figure 2.

Figure 4 is a bottom plan view of the unit shown in Figure 2 with parts broken away.

Figure 5 is a section on the line 5—5, Figure 3.

Figure 6 is a fragmentary section similar to Figure 5 showing a slight modification of the valve mechanism.

Figure 7 is a flow diagram of the system.

Figure 1:
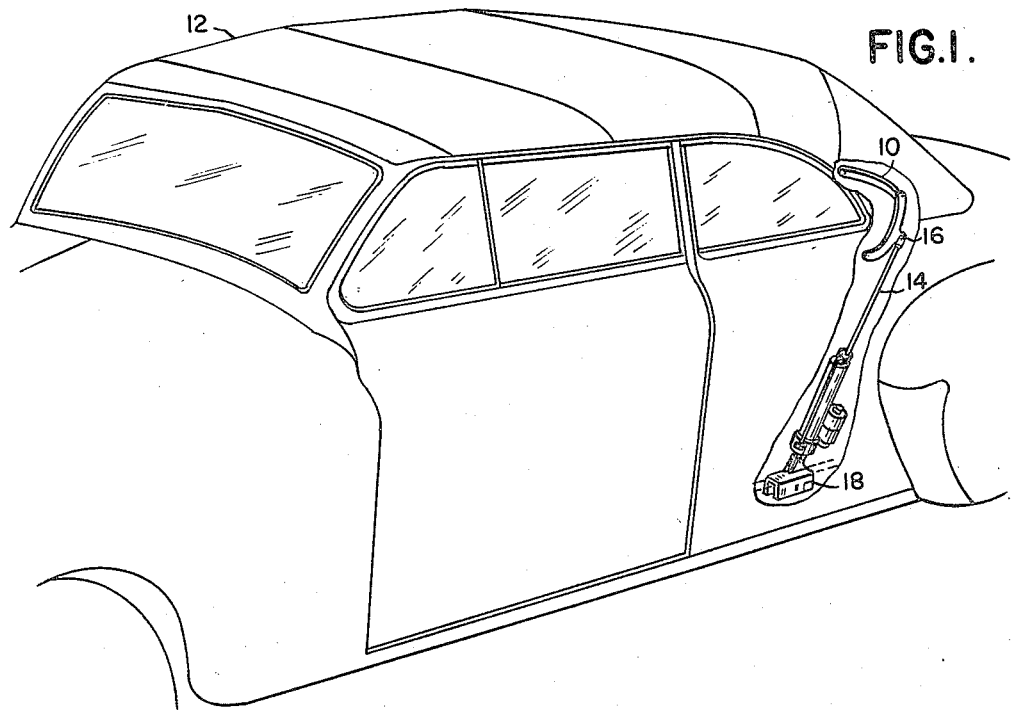
Figure 1 is a fragmentary perspective view illustrating the use of the present power unit for raising and lowering convertible tops of vehicles.

The power unit of the present invention is illustrated in Figure 1 as connected to linkage indicated generally at 10 for raising and lowering a convertible top 12 of a motor vehicle. For this purpose, the power unit includes a piston rod 14 which is connected to the linkage as indicated at 16, the power unit as a whole being pivoted to a rigid supporting member 18 in the vehicle. It will be appreciated that the illustrated use of the power unit is merely exemplary of the many uses to which the power unit may be put, others being raising and lowering of windows, sliding the front seat of the vehicle forwardly and rearwardly, raising and lowering the hood or rear deck, or the like. However, in all of the uses referred to the power unit offers the important advantage that its only connection to an external power source is the electrical wiring for energizing the electric motor which is an element of the power unit. Thus, several of the power units may be employed at different positions within a motor vehicle and all connected to the battery of the vehicle by simple electric wiring.

As applied to a folding top, one complete unit will ordinarily be used at each side of the vehicle. However, in some cases a second power cylinder may be connected to the unit remote therefrom.

Referring now to Figures 2-5 the power unit comprises an electric motor 20, a hydraulic power device 22 which is indicated herein as a piston and cylinder, a rotary pump 24, a reservoir 26, and suitable passages interconnecting the cylinder, the pump, and the reservoir as will subsequently be pointed out.

In order to achieve compactness and increase the simplicity of manufacture, the power unit comprises an integral unitary base 30 which may conveniently be a metal casting. The base 30 is generally somewhat elongated and is provided at one end thereof with a cylindrical pump recess 32 which receives the rotary pump 24. Preferably, the pump 24 is of the well known type comprising a rotary internal gear 34 and a rotary pinion 36 having one less tooth than the internal gear. The gear parts 34 and 36 rotate within the recess 32, which recess is closed by a removable cover plate 38 secured in place by screws indicated at 40.

At the opposite side of the same end of the unitary base at which the recess 32 is provided, there is formed a motor positioning and supporting seat 42 which is axially aligned with the operating axis of the pump pinion element 36. The recess 32 and the motor seat 42 are interconnected by an opening 44 through the unitary base, which receives the shaft 46 of the motor 20. Motor 20 is fastened to the base 30 by screws 47.

Figure 2:
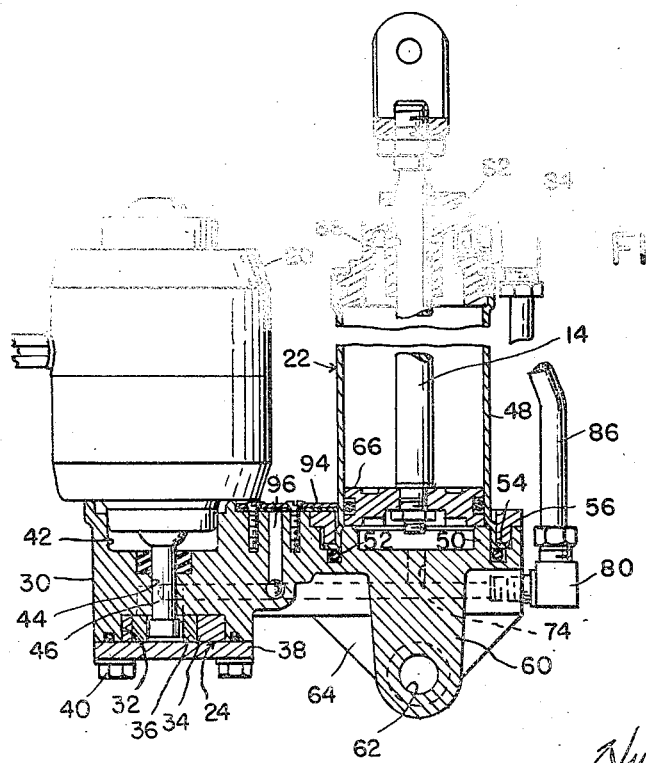
Figure 2 is a side elevation partly in section of the power unit.

At the opposite end of the unitary base 30 there is provided a seat for the reception of the otherwise open end of the cylinder 48. As best seen in Figure 2, the cylinder seat comprises an annular flange 50 and an annular groove 52 surrounding the flange. The lower end of the cylinder is outwardly turned to provide a radial flange 54 which is clamped in place by a retainer ring 56, suitable hydraulic seals being provided, the ring 56 being secured in place by a plurality of screws or the like as indicated at 58.

At the same end of the casting 30 which carries the cylinder seat there is provided a pivot support 60 in the form of depending ear provided with an opening 62 therethrough for the reception of a pivot bolt or the like. The pivot support is strengthened by the provision of supporting webs 64 in the casting. The axis of the opening 62 is located perpendicular to and intersecting the axis of the cylinder 48 so that the power unit as a whole rocks about an axis perpendicular to and intersecting the line of motion of the piston rod 14.

Formed within the unitary base are hydraulic passages for supplying fluid from the pump to opposite sides of the piston 66 so as to move the piston in either direction by the application of power. For this purpose the motor 20 is reversible, the pump 24 being of the type which operates to reverse the flow of fluid upon reversal of direction of rotation on its pinion 36.

Within the casting and in communication with the inner side of the recess 32 are valve ports 68 and 70. A drilled passage 72 located within the body of the unitary supporting base, connects the valve port 68 to a passage 74 opening into the cylinder seat within the annular flange 50. The outer end of the passage 72 is closed by a threaded plug 76. A second drilled passage 78 connects the valve port 70 of the pump to an external fitting 80 which is illustrated as threaded to the end of the passage 78 where the end of the passage intersects one end of the base 30. The cylinder 48 includes an end closure 82 provided with a fitting 84 and a metal conduit 86 interconnecting the fittings 80 and 84 and thus provides for flow of fluid into and out of the upper end of the cylinder 48 above its piston 66. The end closure 82 is provided with an opening 88 through which the piston rod 14 extends.

It will be apparent that operation of the motor 20 in forward and reverse direction will cause corresponding rotation of the pump and will cause corresponding raising and lowering of the piston 66 in the cylinder 48. However, in order to insure positive operation it is essential that the entire hydraulic system be maintained full of hydraulic fluid. This requires the addition of a fluid reservoir inasmuch as upward motion of the piston, as seen in Figure 2, in response to the flow of a definite amount of hydraulic fluid into the lower end of the cylinder, will displace less hydraulic fluid from the upper end of the cylinder due to the presence of the piston rod in that portion of the cylinder above the piston 66. In order to accommodate the excess hydraulic fluid and to keep it available to make up the net gain in volume in the operating part of the system when the piston is moving upwardly, the unitary base 30 is provided with an enlarged cavity therein which constitutes the hydraulic reservoir 26. This cavity is well illustrated in Figures 3 and 5, the outline of the reservoir being indicated by the dotted line 90 and a portion of it being shown in full where the corner of the upper portion of the structure is broken away as indicated at 92. It will be observed that the cavity or reservoir is of substantially the full height of the main portion of the casting and is closed at its upper end by a removable cover plate 94. The reservoir extends transversely across the center line joining the axis of the motor and pump combination and the axis of the cylinder, and on this center line the width of the reservoir is substantially reduced as indicated at 96. The bottom of the reservoir, as best seen in Figure 5, extends to the dotted line 98 except where the casting includes the upstanding boss 100 which is provided to receive valve structure later to be described. The removable cover plate 94 includes removable threaded filling plugs 102.

In order to control flow of fluid into and out of the reservoir 26 the main base or casting 30 is provided with a transverse bore 104 having enlarged chambers 106 and 108 at opposite ends thereof intersecting passages 78 and 72 respectively, as best seen in Figure 5. Another passage 110 is provided which connects the reservoir 26 with a portion of the passage 104 intermediate its ends. The intersection between the passage 104 and the chambers 106 and 108 constitute valve seats and in association with these seats there are provided ball valves 112 and 114 respectively. The ends of the enlarged chambers 106 and 108 are closed by threaded plugs 116 and 118 respectively. Located within the passage 104 and intermediate the ball valves 112 and 114 is a compression spring 120 which normally retains both ball valves 112 and 114 off their respective seats.

The strength of spring 120 is sufficient to insure that both valves 112 and 114 cannot be closed simultaneously. Alternatively, the convolutions of the spring may be sufficiently close so that they abut to form a rigid member before both valves could be seated.

Before referring to the operation of the hydraulic system, reference is made to Figure 6 which shows a construction differing from that of Figure 5 only in that instead of interposing a spring 120 between the ball valves 112 and 114, there is employed a rigid pin 122, the length of which is such that in centered or balanced condition, both ball valves 112 and 114 remain off their seats. However, when one of the ball valves 112 or 114 is moved to closed position, the pin 122 insures that the remaining ball valve is positively moved away from its seat and is maintained in open position. Balancing springs 124 and 126 are provided interposed between the ball valves 112 and 114 respectively, and the closure plugs 128 and 130.

It will be observed from an inspection of Figure 5 that the ball valves 112 and 114 do not interfere with the flow of fluid through the passages 72 and 78 respectively, and this is true whether the ball valves are in open or closed position with respect to their valve seats.

With the parts in the position illustrated in Figures 2 and 7, if it is desired to raise the piston 66 in the cylinder 48, the motor is energized in the proper direction to cause the pump 24 to supply a pressure flow of fluid through the passages 72 and 74 into the lower end of the cylinder. This will have the effect of lifting the piston and thereby dispelling fluid from the upper end of the cylinder through the fitting 84, conduit 86, fitting 80, and drilled passage 78 back to the other side of the pump. However, since a substantial volume of the cylinder 48 above the piston 66 is occupied by the piston rod 14, the amount of fluid displaced from the upper end of the cylinder is less than the amount of fluid forced by the pump into the lower end of the cylinder. To make up the extra amount of fluid required to elevate the piston over that supplied by the return passage 78, a flow of fluid takes place from the reservoir 26 into the passage 78. At this time the establishment of pressure in the conduit 72 will have caused the ball valve 114 to close, thus preventing the flow of fluid from the pump to the reservoir. Closure of the ball valve 114 establishes a force on the ball valve 112, tending to cause it to move to a position further away from its valve seat. Inasmuch as the passage 78 is connected to the suction side of the pump, fluid will flow from the reservoir 26 through the passage 110 into the passage 104, past the ball valve 112, into the chamber 106, and thence through the passage 78 to the inlet side of the pump. Thus, the excess hydraulic fluid required beneath the piston over the amount displaced from the upper end of the piston is made up from the reservoir.

If conditions are reversed and the piston 66 is forced downwardly by the flow of fluid from an upper or intermediate position, the reservoir will accommodate the excess fluid, thus maintaining the operating parts of the system full of hydraulic fluid at all times and in condition for immediate response upon energization of the motor 20. Specifically, when fluid is supplied upon appropriate rotation of the pump to the conduit 78 and thence through fitting 80, conduit 86, fitting 84 to the upper end of the cylinder 48, the return flow of fluid in greater quantity takes place through passage 74 and passage 72 to the pump port 68. At this time pressure is established by the pump in the conduit 78 with the result that ball valve 112 is seated and accordingly flow of fluid from the passage 78 and chamber 106 into the reservoir is prevented. However, as the flow of fluid from the lower side of the cylinder through the conduit 72 exceeds the flow of fluid through the pump, the pressure will increase in passage 72 to some extent and fluid will flow past the ball valve 112 through the passages 104 and 110 into the reservoir 26. The tendency of this flow to close the ball valve 112 is effectively prevented either by the spring 120 or the pin 122, since a much greater pressure is acting on the other ball valve 114 at this time.

When the power unit disclosed herein is used to raise and lower a convertible top, it is desirable for the valve structure to permit manual operation in either direction in the event of power failure. This is provided in the present construction. The pump 24 is designed to have clearance between the sides of the rotary parts and the end walls of the pump recess. This permits a by-pass flow directly from the outlet port through the pump when the piston has reached either end of its stroke. In addition, it permits a by-pass flow through the pump when the motor is not operating.

Referring now to the diagram of Figure 7, if manual operation results in a downward force on the piston, the leverage of the operated parts results in building up a relatively high pressure in passage 72, and valve 114 closes. However, by-pass flow through the pump permits the top to be moved slowly. The excess fluid developed in the system flows into the reservoir 26 past the valve 112. If the direction of mechanical force is reversed, upward motion of piston 66 builds up pressure in passage 78, closing valve 112. By-pass flow through the pump permits slow movement of the top, and the excess fluid required in the system by upward movement of the piston flows from reservoir 26 past valve 114 into passage 72.

From the foregoing detailed description of the compact power unit it will be apparent that the essential operating elements are all supported directly on or housed within a single unitary casting. Moreover, the arrangement of the elements on and in this casting is such as to take maximum advantage of the casting to provide the fluid reservoir therein and to position the cylinder and motor in closely spaced parallel relationship so as to occupy a minimum of space. While the unitary base or casting thus accomplishes a great many purposes, it nevertheless remains a relatively simple structure easily cast to the shape illustrated, and provided with the bored passages and recesses in simple machine operations. Thus, there is provided an inexpensive, efficient motor, pump and cylinder power unit combining the advantages inherent in the use of electric motive power and the advantages inherent in the use of hydraulic mechanism for effecting the actual movement of the mechanism operated by the power unit.

When two independent units are employed, as in actuating the folding top, there is an important advantage obtained in automatic equalization of action. In some prior constructions, where separate motor units were employed with mechanical drive to the linkage, there was a tendency for one unit to get ahead of the other and binding and improper action of the top linkage resulted. With the present construction, if one unit gets ahead of the other, the increased resistance to motion increases the pressure and a greater by-pass flow through the pump results, thus equalizing pressure and keeping both sides of the top structure in step. At the same time, the preferred present system avoids the external piping required when one pump is connected to a plurality of power cylinders.

The drawings and the foregoing specification constitute a description of the improved power unit in such full, clear, concise and exact terms as to enable any person skilled in the art to practice the invention, the scope of which is indicated by the appended claims.

What I claim as my invention is:

1. An elongated support casting comprising a cylinder support including a circular seat surrounded by an annular flange adapted to support the open end of a power cylinder and to constitute an end closure therefor, a pivot support mounting on said casting directly opposite said seat and having its pivot axis intersecting the axis of said seat and flange, a circular pump recess in said casting adapted to receive a rotary pump, said casting having integral circular motor support and positioning means thereon axially aligned with the pump axis, a first fluid passage in said casting extending from one side of said pump and opening into said circular seat, a second fluid passage in said casting extending from the other side of said pump to a port in said casting adjacent said seat for connection to a conduit connected to the opposite end of a cylinder on said seat, said casting having an enlarged cavity formed therein to act as a reservoir for hydraulic fluid, passages in said casting connecting said reservoir to each of said first and second passages, and check valves in said last recited passages.

2. Structure as defined in claim 1 in which said casting is elongated, said cylinder support and said pivot support are at one end of said casting, said pump recess and said motor support and positioning means are at the other end of said casting, and said cylinder support and said motor support and positioning means are at the same side of said casting.

3. Structure as defined in claim 2 in which said cavity is located intermediate said cylinder support and said motor support and positioning means, said cavity being of reduced cross-section on the centerline joining said cylinder support and motor support and positioning means, and being laterally enlarged at opposite sides of said centerline.

4. A power unit comprising an elongated generally flat base, a circular recess at one side of said base adjacent one end thereof, a rotary pump in said recess, a circular motor seat at the opposite side of said base in axial alignment with said recess, an electric motor on said seat, said base having an opening extending from said motor seat to said recess, said motor having a drive shaft extending through said opening and connected to said pump, a cylinder seat on said base at the same side thereof as said motor seat, a power cylinder on said cylinder seat having one end closed thereby and extending outwardly from said base parallel to and in proximity to said motor, said base having a cavity therein constituting a fluid reservoir, a first passage in said base connecting one side of said pump to said cylinder seat, a second passage on said base connecting the other side of said pump to a port adjacent said cylinder, an external conduit connecting said port to the outer end of said cylinder, and additional passage and valve means connecting said first and second passages to said reservoir and controlling the flow of fluid to and from said reservoir.

5. A power unit as defined in claim 4 in which said cavity is transversely restricted on the center line joining the motor seat and cylinder seat and is laterally enlarged at opposite sides of said center line.

6. A power unit as defined in claim 4 in which said reservoir comprises a cavity in said base open at the same side of said base as said motor and cylinder seats and a removable cover for said cavity, and said first, second and additional passages include portions extending between the bottom wall of said cavity and the opposite side of said base.

7. A power unit as defined in claim 4, said base having a pivot mounting element extending therefrom opposite said cylinder seat and including means for mounting said base for rocking movement about an axis perpendicular to and intersecting the axis of said power cylinder.

8. A power unit comprising a generally flat body having a pump recess at one side adjacent one end thereof, a motor seat at the other side of said body in alignment with said pump recess, a cylinder seat at the same side of said body as said motor seat, a reservoir cavity in said body open at the side thereof provided with said seats, said reservoir cavity extending generally transversely of said body intermediate said seats, and passages including passages in said body connecting said pump recess, said reservoir cavity, and said cylinder seat.

9. A unit as defined in claim 8 in which said reservoir cavity is enlarged adjacent the edges of said body and is of substantially less width centrally thereof.

STEWART B. McLEOD.

References Cited in the file of this patent

UNITED STATES PATENTS

| Number | Name | Date |
|---|---|---|
| 1,078,127 | Coleman | Nov. 11, 1913 |
| 2,119,632 | Barrett | June 7, 1938 |
| 2,143,546 | Day | Jan. 10, 1939 |
| 2,388,755 | McLeod | Nov. 13, 1945 |
| 2,462,246 | Worthington | Feb. 22, 1949 |
| 2,543,989 | Rockwell | Mar. 6, 1951 |
| 2,544,990 | Harrington et al. | Mar. 13, 1951 |
| 2,586,682 | McLeod | Feb. 19, 1952 |

FOREIGN PATENTS

| Number | Country | Date |
|---|---|---|
| 781 | Great Britain | Jan. 11, 1898 |